(12) United States Patent
Cai et al.

(10) Patent No.: US 7,851,958 B2
(45) Date of Patent: Dec. 14, 2010

(54) ELECTRIC MACHINE WITH INTERIOR PERMANENT MAGNETS

(75) Inventors: Wei Cai, Carmel, IN (US); David Fulton, Anderson, IN (US)

(73) Assignee: Remy International, Inc., Pendleton, IN (US)

( * ) Notice: Subject to any disclaimer, the term of this patent is extended or adjusted under 35 U.S.C. 154(b) by 232 days.

(21) Appl. No.: 11/811,722

(22) Filed: Jun. 12, 2007

(65) Prior Publication Data
US 2008/0007131 A1    Jan. 10, 2008

Related U.S. Application Data

(60) Provisional application No. 60/812,788, filed on Jun. 12, 2006.

(51) Int. Cl.
*H02K 19/00* (2006.01)
(52) U.S. Cl. ............... 310/156.53; 310/156.57
(58) Field of Classification Search ........... 310/156.53, 310/156.56, 156.57, 156.01, 156.38
See application file for complete search history.

(56) References Cited

U.S. PATENT DOCUMENTS

| | | | |
|---|---|---|---|
| 6,340,857 B2 | 1/2002 | Nishiyama | |
| 6,774,523 B2 * | 8/2004 | Ahn et al. | 310/216.023 |
| 6,777,838 B2 | 8/2004 | Miekka et al. | |
| 6,794,784 B2 * | 9/2004 | Takahashi et al. | 310/156.56 |
| 6,919,663 B2 * | 7/2005 | Iles-Klumpner | 310/156.53 |
| 6,924,722 B2 | 8/2005 | Doi et al. | |
| 6,940,205 B1 | 9/2005 | Murakami et al. | |
| 2004/0217666 A1 | 11/2004 | Mellor et al. | |
| 2005/0269888 A1 | 12/2005 | Utaka | |
| 2006/0028082 A1 | 2/2006 | Asagara et al. | |

\* cited by examiner

*Primary Examiner*—Dang D Le
(74) *Attorney, Agent, or Firm*—Maginot, Moore & Beck

(57) ABSTRACT

An electric machine is disclosed herein comprising a stator and a rotor opposing the stator. A plurality of slots are formed in the rotor, each of the plurality of slots including a stator side and an opposing side. Each of the plurality of slots further include a central magnet retaining portion positioned between two opposing end portions of the slot. The central magnet retaining portion is defined by at least one protrusion formed on the stator side of the slot. The at least one protrusion forms a neck in the slot and separates the magnet retaining portion from one of the end portions. A magnet is positioned in the magnet retaining portion of the slot. The two opposing end portions of the slot are empty, providing voids at the ends of the slot.

20 Claims, 8 Drawing Sheets

ELECTRIC MACHINE WITH INTERIOR PERMANENT MAGNETS

CROSS REFERENCE TO RELATED APPLICATIONS

This application claims the benefit of earlier filed U.S. provisional application No. 60/812,788, filed Jun. 12, 2006.

FIELD

This application relates to the field of electric machines, and particularly electric machines having permanent magnets.

BACKGROUND

Interior permanent magnet machines have been widely chosen as driving and generating machines for various applications, including hybrid electric vehicles. Internal permanent magnet (IPM) electric machines have magnets built into the interior of the rotor. Typically, each magnetic pole on the rotor is created by putting permanent magnet (PM) material into one or more slots formed in the laminated stack of the rotor. Although slots are formed for the magnets, the slots are typically not completely filled with magnetic material. In particular, the slots are typically longer than the magnets, and the magnets are placed in the center portion of each slot. This results in a slot with a magnet in the center and voids at two opposite ends of the slot.

There are several reasons for shaping slots longer than the magnets such that voids are provided at the ends of the slots. One reason relates to the performance of the electric machine. If the PM material filled the slot, the ends of the magnet would tend to short circuit, making ineffective use of the PM material. Also, magnetic design for the flux in the steel that makes up the rotor favors smooth curve ends on the slot, rather than sharp corners as are typically provided at the ends of the magnets.

At least one other reason for shaping elongated slots relates to manufacturing issues. For example, to reduce manufacturing costs, it is generally desirable to minimize the amount of finish grinding on the magnet blocks. With elongated slots, only the sides of the magnet that will fit closely against the walls of the lamination stack within the slot need to be ground. Finish grinding is generally not required on the two magnet sides that face the slot ends. However, if the magnet was to fit closely with all sides of the slot, then grinding would be required on all sides of the magnet in contact with the lamination stack. In addition to the above, the additional room provided by the elongated slots makes it easier to insert the magnets into the slots during manufacturing.

Because of this rotor arrangement of curved slot ends and magnets that are shorter than the slots, some feature must be utilized to maintain the proper position of the magnets within the slots. Without such stabilizing features, the magnets would slide between the voids at the end of the slots. However, the use of stabilizing features in an IPM machine can affect the magnetic fields within the machine. If care is not taken in the design of the IPM machine, situations can occur where the magnetic fields can demagnetize the permanent magnets over time. Irreversible demagnetization of the permanent magnets can lead to decreased performance of the electric machine.

Accordingly, it would be desirable to provide stabilizing features for an IPM machine. It would also be desirable if such stabilizing features did not adversely affect the magnetic fields and related magnetic properties in the electric machine which might lead to demagnetization of the machine's permanent magnets. Furthermore, it would be desirable if such stabilizing features could be provided at a relatively small increase in manufacturing costs.

It would be desirable to provide a permanent magnet electric machine that provides one or more of these or other advantageous features as may be apparent to those reviewing this disclosure. However, the teachings disclosed herein extend to those embodiments which fall within the scope of the appended claims, regardless of whether they accomplish one or more of the above-mentioned advantages.

SUMMARY

An electric machine is disclosed herein comprising a stator and a rotor opposing the stator. A plurality of slots are formed in the rotor, each of the plurality of slots including a stator side and an opposing side. Each of the plurality of slots further include a central magnet retaining portion positioned between two opposing end portions of the slot. The central magnet retaining portion is defined by at least one protrusion formed on the stator side of the slot. The at least one protrusion forms a neck in the slot and separates the magnet retaining portion from one of the end portions. An indentation in the slot may be provided adjacent to the at least one protrusion in the slot. A magnet is positioned in the magnet retaining portion of the slot. The two opposing end portions of the slot are empty, providing voids at the ends of the slot.

The above described features and advantages, as well as others, will become more readily apparent to those of ordinary skill in the art by reference to the following detailed description and accompanying drawings.

DESCRIPTION

Figure 1:
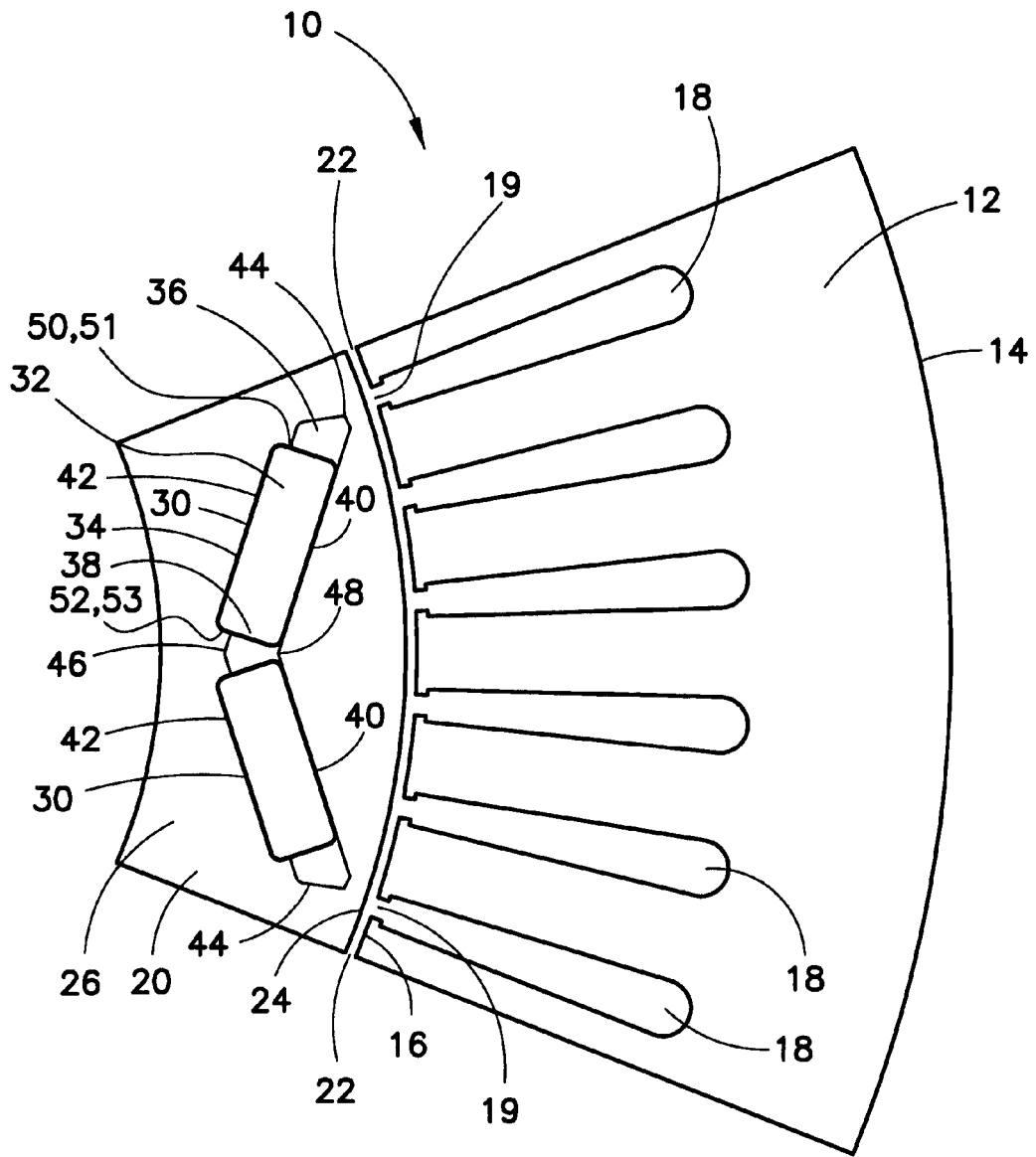
FIG. 1 shows a partial view of an electric machine including a stator and a rotor with internal permanent magnets.

With reference to FIG. 1, a partial view of an electric machine is shown. The electric machine 10 comprises a stator 12 and a rotor 20 opposing the stator 12. A plurality of slots 30 are formed in the rotor 20, each of the plurality of slots are configured to hold a permanent magnet 32. It will be appreciated that FIG. 1 shows only about 45° of the rotor and stator arrangement which actually extends 360° to form a complete circular arrangement.

The stator 12 includes a main body portion comprised of a plurality of laminate stacks of ferromagnetic material, such as silicon steel. The stator 12 is generally disc shaped and includes a circular or polygonal outer perimeter 14 and a circular inner perimeter 16. An inner cavity configured to receive the rotor 20 is formed within the inner perimeter 16 of the stator. Winding slots 18 are formed in the stator. Openings 19 to the winding slots are provided at the inner perimeter 16 of the stator. Conductors 28 (not shown in FIG. 1; see FIG. 5) are placed in the winding slots 18 to form armature windings for the electric machine on the stator.

The rotor 20 includes a main body portion that is also comprised of a ferromagnetic material, such as steel. The rotor 20 is generally disc shaped and includes a circular outer perimeter 24. The rotor is designed and dimensioned to fit within in the inner cavity of the stator 12 such that the circular outer perimeter 24 of the rotor 20 is positioned opposite the circular inner perimeter 16 of the stator 12. A small air gap 22 separates the stator from the rotor. In at least one alternative embodiment which is generally opposite to that of FIG. 1, the rotor could be positioned outside of the stator, wherein the stator is positioned opposite an inside perimeter of the rotor.

The slots 30 in the rotor 20 each include a central magnet retaining portion 34 positioned between two opposing end portions 36, 38. The magnet retaining portion 34 is designed to snugly hold one of the permanent magnets 32. The magnets 32 in the embodiment of FIG. 1 are generally rectangular in shape, and thus the magnet retaining portion 34 of the slot is similarly rectangular in shape, and slightly larger than the magnet 32 such that the magnet may be inserted into the magnet retaining portion 34 of the slot. The opposing end portions 36, 38 of the slot are non-ferromagnetic portions. These non-ferromagnetic portions are designed to remain empty, providing voids in the opposing end portions 36, 38, or be filled by non-ferromagnetic materials, such as nylon. Thus, the end portions provide two non-ferromagnetic portions with the magnet retaining portion positioned between the non-ferromagnetic portions.

Figure 3:
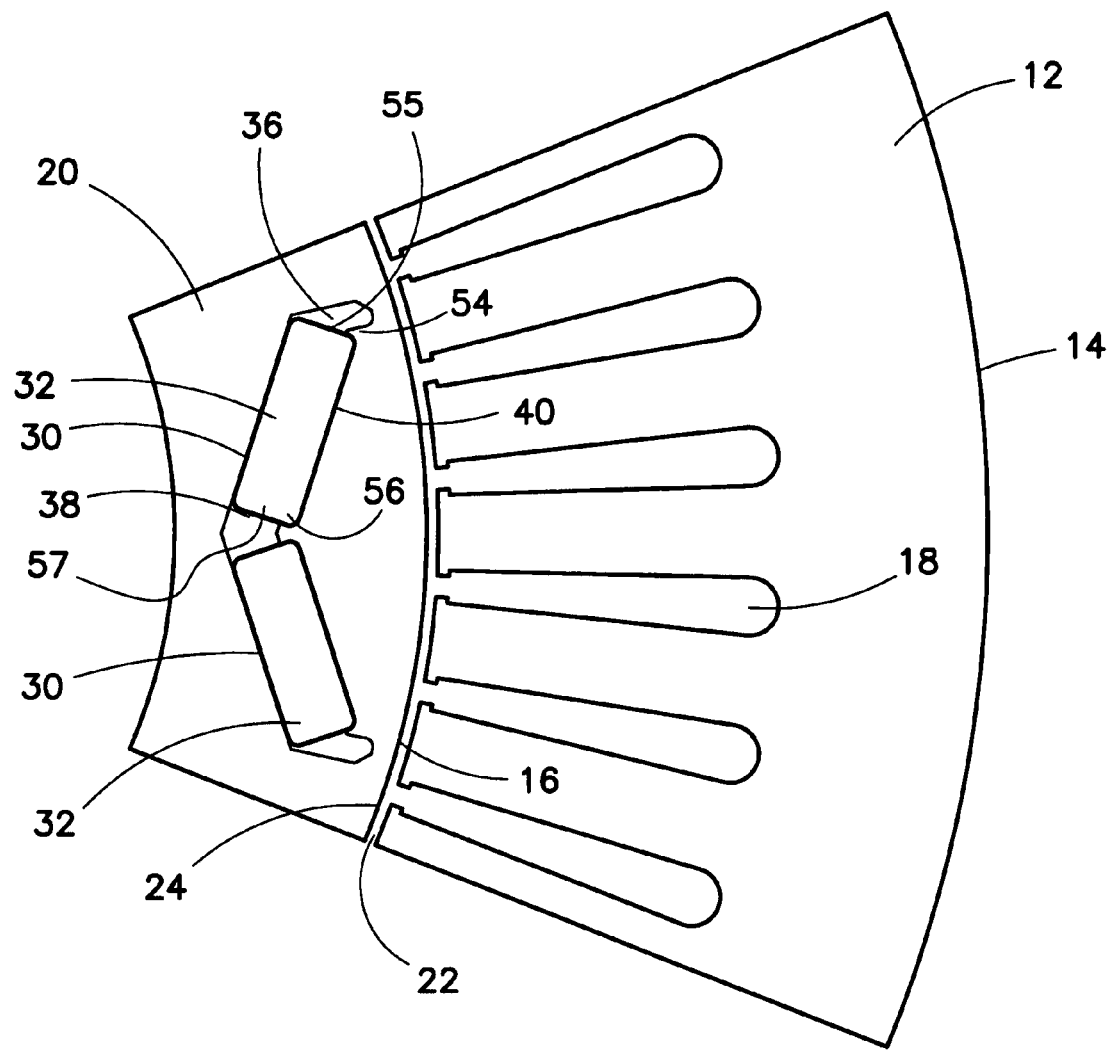
FIG. 3 shows a partial view of an alternative embodiment of the electric machine of FIG. 1 where magnet locators are moved to the stator side of the slot.
Figure 5:
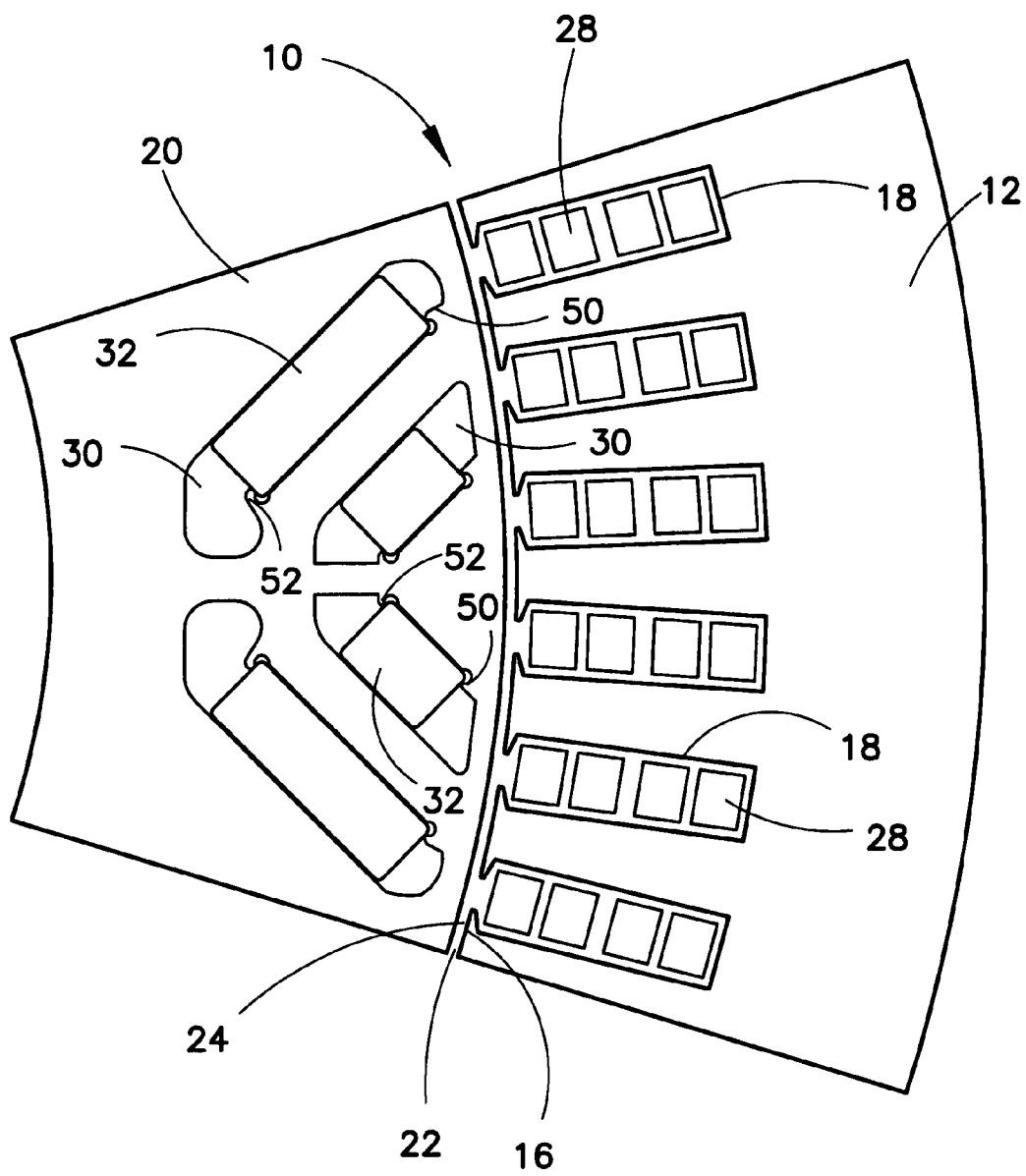
FIG. 5 shows an alternative embodiment of the electric machine of FIG. 3 where indentations are associated with the magnet locators.
Figure 6:
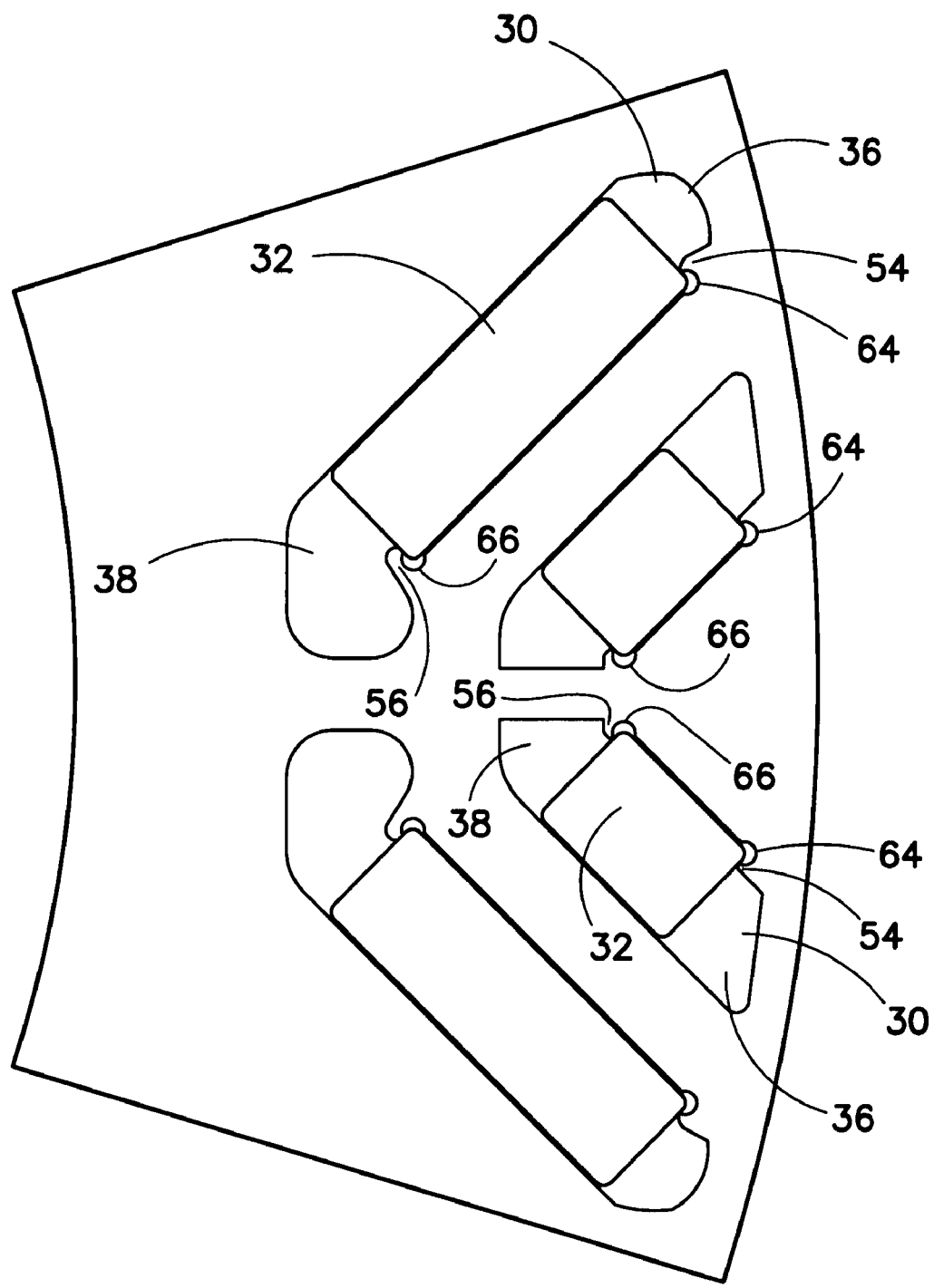
FIG. 6 shows an enlarged view of the rotor of the electric machine of FIG. 5.
Figure 7:
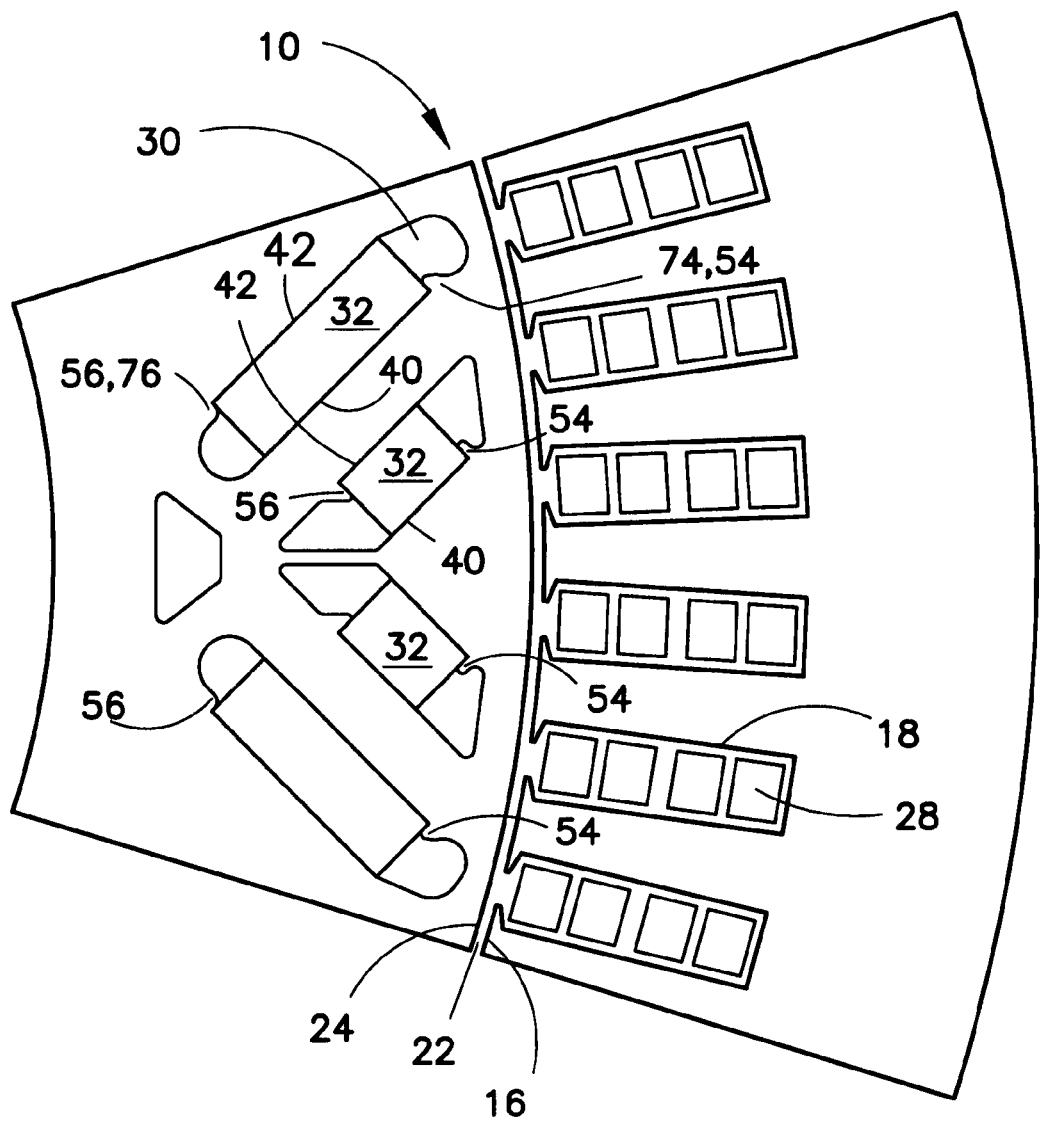
FIG. 7 shows an alternative embodiment of the electric machine of FIG. 3 where one magnet locator is on the stator side of the slot and another magnet locator is on an opposite side of the slot.

As shown in each of FIGS. 1, 3 and 5-7, the slots 30 in the rotor 20 are configured in a V-shaped slot arrangement, with each slot providing at least one of two opposite legs of the V-shape. Each V-shaped slot arrangement includes a mouth end that opens toward the stator 12 and a vertex end (or tip end) that is closer to the center of the rotor 20 than the mouth end. The two slots 30 providing the opposite legs of the V-shape in the V-shaped slot arrangement are either in contact (as shown in FIG. 3) or are closest together (as shown in FIGS. 5-7). The V-shaped slot arrangement also includes an inner side and an outer side with the inner side open to and facing the portion of the stator that is closest to the mouth end of the V-shaped slot arrangement. Each slot 30 that forms a leg of the V-shaped slot arrangement includes two elongated sides. The two elongated sides of each slot include an inner-V side 40 (also referred to herein as a stator side 40) and an outer-V side 42 (also referred to herein as an opposing side 42). The stator side 40 is generally positioned closer to the stator than the opposing side 42. Accordingly, the stator side 40 of the slot 30 generally opposes the outer periphery 24 of the rotor and the opposite side 42 of the slot 30 generally opposes an inner periphery of the rotor. In the embodiment of FIG. 1, the elongated sides merge together in one region of the slot indicated by reference numeral 44 at one end of the slot (i.e., at the mouth end of the V-shaped slot arrangement). At the opposite end of the slot (i.e., at the tip end of the V-shaped slot arrangement), the elongated sides feed into other elongated sides of a different slot, as indicated by reference numerals 46 and 48. Thus, two slots may be provided within a single formed cavity in the rotor, as shown in FIGS. 1 and 3). In an alternative embodiment, the slots may be completely separated at the tip end of the V-shaped slot arrangement, as shown in FIGS. 5-7, such that two separate slots form the V-shaped slot arrangement. In this embodiment, the elongated sides of different slots do not connect together. Instead the elongated sides may be connected by shorter sides at both ends of the slot such that a single slot is provided by a single cavity (see, e.g., FIG. 7), and two different slots provide the V-shaped arrangement.

The magnet locators 50, 52 define the boundary of the central magnet retaining portion 34 of the slot 30. The portion of the slot between the magnet locators 50, 52 defines the central magnet retaining portion 32; the void portions (i.e., the non-ferromagnetic portions) that border the central magnet retaining portions define the end portions 36, 38 of the slot. The magnet locators 50, 52 are spaced in the slot such that they fit up against opposing shorter ends of the magnet 32 to be placed in the slot. Accordingly, with the magnet locators 50, 52, the slot is configured such that the shape of the slot retains the magnet in its proper position once it is inserted in the slot.

In the embodiment of FIG. 1, the magnets 32 are generally rectangular in shape and are designed to fit snugly in the central magnet retaining portion 34. Accordingly, the rectangular magnet includes two elongated sides that abut the elongated sides 40, 42 of the slot 30. The magnet 32 also includes two shorter sides that abut the magnet locators 50, 52 at the boundary of the central portion 34. Thus, all four sides of the rectangular magnet abut a solid surface, and this arrangement secures the magnet 32 in place within the slot 30.

Figure 2A:
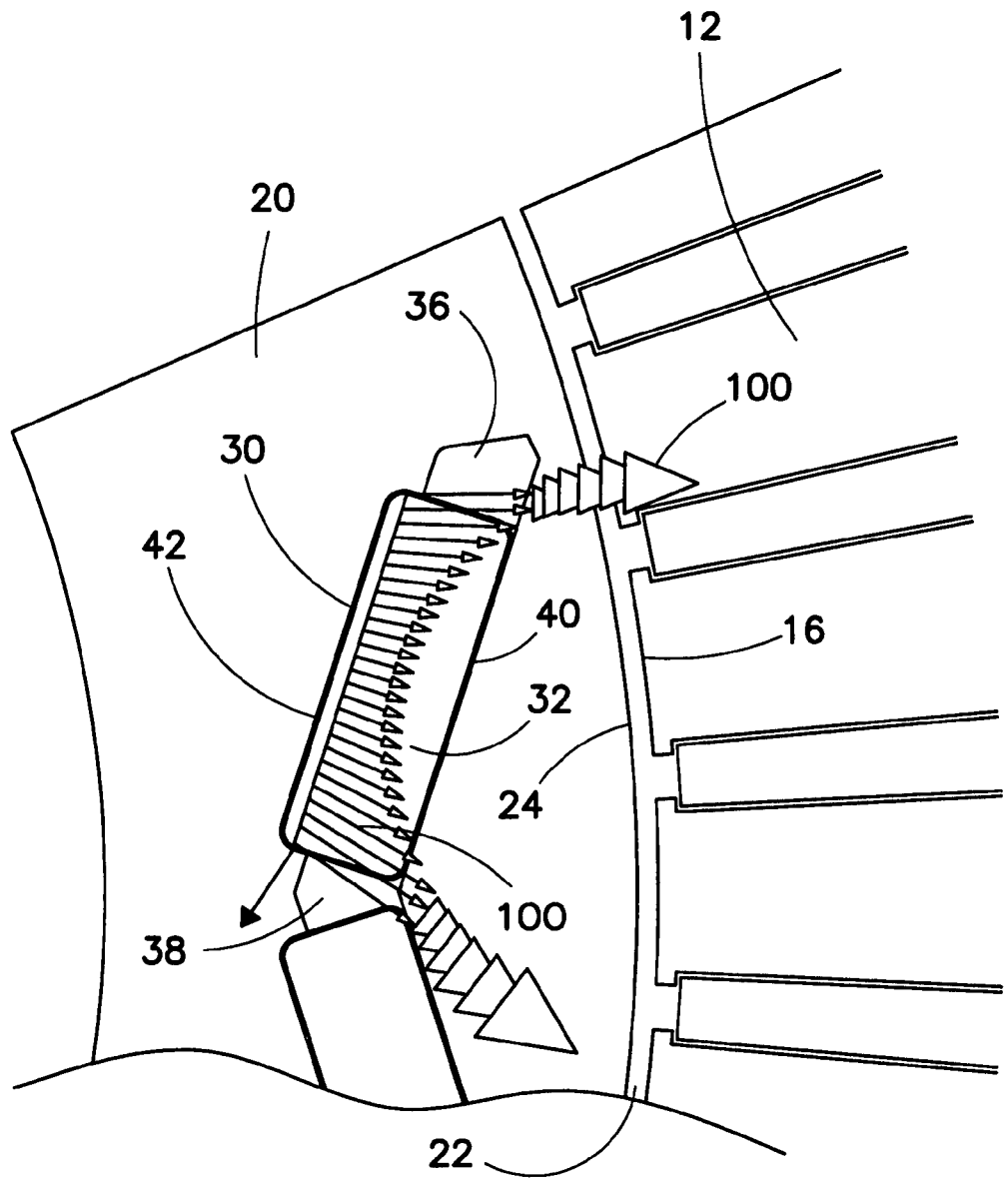
FIG. 2A shows magnetic flux density vectors for one of the magnets of FIG. 1 when the electric machine is not in operation.

FIG. 2A shows magnetic flux density vectors 100 (also referred to herein as B-vectors) in the magnet 32 when the electric machine is not in operation. As shown in this figure, the flux density distribution is symmetrical, with the flux density greater at the shorter edges of the magnet and directed from the magnet toward the stator. This is the standard flux density distribution in the magnet without outside influences.

Figure 2B:
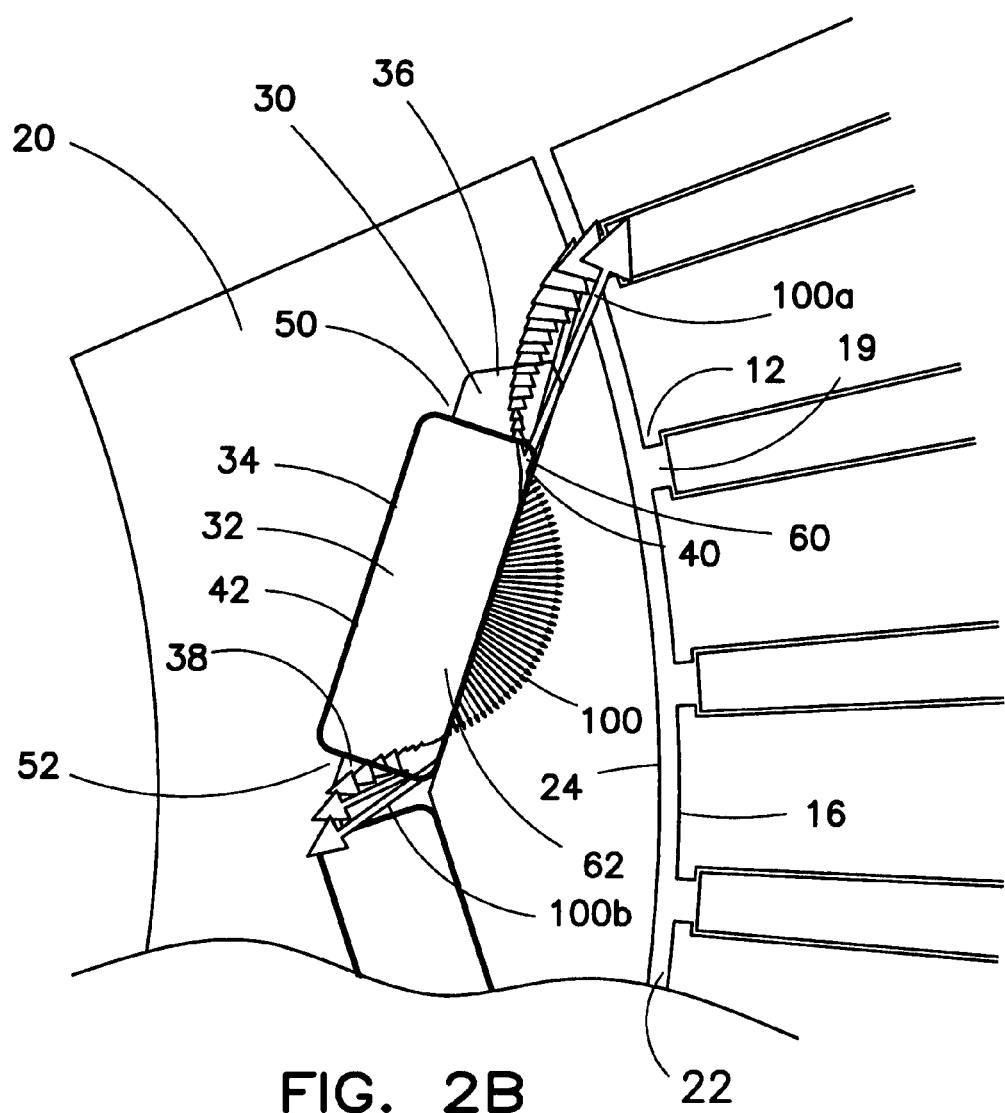
FIG. 2B shows magnetic flux density vectors for the magnet of FIG. 1 during operation of the electric machine.

FIG. 2B shows magnetic flux density vectors 100 in the permanent magnet 32 during actual operation of the electric machine. As shown in FIG. 2B, the flux density distribution 100 in the magnet has been altered by the magnetic forces provided from the armature windings when current runs through the windings during operation of the electric machine. While the flux density vectors at the central portion of the magnet extend toward the stator, the flux density vectors at the corners of the magnet 32 have been significantly altered. For example, the B-vectors 100a at corner 60 have been altered to extend almost parallel to the edge line of the magnet. Furthermore, the B-vectors 100b at corner 62 are rotated to the extent that they are directed away from the stator. In both cases, the magnetic forces from the armature windings re-direct the B-field of the magnet in a manner significantly different from the magnet's normal direction. When the permanent magnet 32 is exposed to sufficiently strong demagnetizing forces, the permanent magnet will have local demagnetization. With additional cycles of applying an opposing B-field, this locally demagnetized region may expand and cause reduction of permanent magnet excitation, resulting in decreased performance of the electric machine.

In order to avoid irreversible demagnetization of the permanent magnets, without losing performance, higher grade permanent magnet material may be used. More specifically, a higher coercivity magnet may be used. Within a grade of magnet, Br can be traded off for more coercivity, but the torque output of the machine will drop. To keep the torque output and increased resistance to demagnetization, the same Br and more coercivity is needed, which results in a higher energy product (grade) material). These higher grades of permanent magnet material are less susceptible to demagnetization. With higher grade permanent magnet material, magnetic forces from the armature are less likely to deteriorate and demagnetize the corner regions of the permanent magnet over time. Unfortunately, such higher grade permanent magnet material is also expensive and increases the overall cost of the electric machine.

FIG. 3 shows an alternative embodiment of the electric machine of FIG. 1. The arrangement of FIG. 3 is the same as that of FIG. 1 except that the position of the magnet locators 50, 51 have been changed from the elongated inner side 42 of the slot 30 to the elongated stator side 40 of the slot 30. In particular, as shown in FIG. 3, no protrusions or other magnet locators exist on the inner side 42 of the slot 30, and instead, a continuous surface is provided that is free of surfaces that extend into the slot in a manner that would define a neck, shelf, or other feature designed to abut against the end of the magnet 32 to hold it in place. By contrast, on the stator side 40 of the slot 30, a first protrusion 54 is provided at the first end portion 36, and a second protrusion 56 is provided at the second end portion 38. These protrusions 54, 56 define two necks 55, 57 at opposite ends of the slot. Each protrusion 54, 56 provides a shelf-like surface that abuts the magnet 32 and holds the magnet in place within the slot. In the embodiment of FIG. 3, the protrusions 54, 56 are rounded, knob-like extensions into the slot 30. In alternative embodiments, the protrusions could define polygonal shapes with edges or sharp angles provided in the slot.

Figure 4:
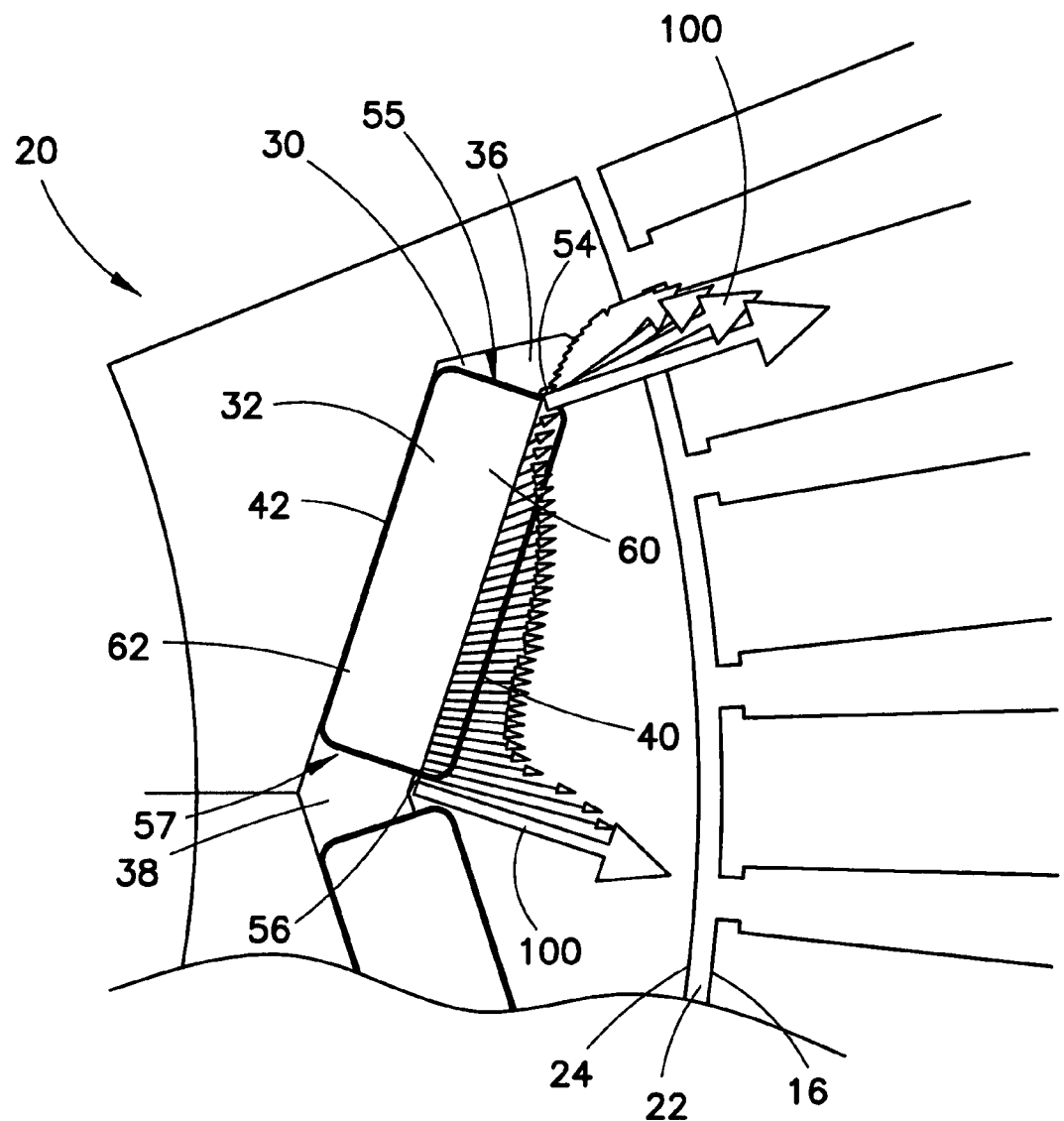
FIG. 4 shows magnetic flux density vectors for the magnet of FIG. 3 during operation of the electric machine.

FIG. 4 shows magnetic flux density vectors in the permanent magnet 32 of FIG. 3 during actual operation of the electric machine. By comparing FIG. 4 with FIG. 2A, it can be seen that the flux density vectors 100 in the magnet have been only slightly altered by the magnetic forces provided from the armature windings during operation of the electric machine. In particular, the B-vectors at the corners 60 and 62 in FIG. 4 remain substantially in the same direction and magnitude as those shown in FIG. 2A. This is much different from the case of the embodiment of FIG. 1 where the differences of the flux density vectors in FIG. 2B were substantial compared to those of FIG. 2A. Accordingly, even though the same grade of magnet is used in FIGS. 1 and 3, the arrangement of FIG. 3 makes the magnet 32 less susceptible to demagnetization over time than the arrangement of FIG. 1. Therefore, the embodiment of FIG. 3 provides an electric machine that is less likely to experience permanent magnet demagnetization without the increased cost associated with higher grade magnets.

FIGS. 5 and 6 show another alternative embodiment of an electric machine where magnet locators 50, 52 are provided in the slots 30. In the embodiment of FIGS. 5 and 6, the slots and associated magnets are provided in a nested fashion with two larger slots and magnets formed about two smaller slots and magnets. Furthermore, the slots shown in FIGS. 5 and 6 each include two slot indentations 64, 66 that are associated with the two protrusions 54, 56. This is best seen in the enlarged view of the rotor 20 shown in FIG. 6.

As shown in FIG. 6, the slot protrusions 54, 56 are both provided on the stator side 40 of the slot 30. However, distinct from the embodiment of FIG. 3, the central portion 34 of each slot includes two slight indentations 64, 66 that are immediately adjacent to the respective protrusions 54, 56 in the slot. The indentations 64, 66 extend the slot further to the stator side perimeter 24 of the rotor 20 than the portions of the slot immediately adjacent to the indentations. The indentations 64, 66 each provide a curved section with a radius that departs from that of the magnet 32 such that an additional void (or other non-ferromagnetic portion) is formed in the slot by the indentation. The indentations 64, 66 not only provide additional space in the slot to assist with inserting the magnets 32 into the slot, but also even further reduce the susceptibility of the permanent magnets to demagnetization. It will be recognized that the indentations 64, 66 are shown in FIG. 6 as being rounded, but may also be shaped with angles that make the indentations resemble a polygon.

With reference now to FIG. 7, an alternative embodiment of an electric machine 10 is shown. In this embodiment, the magnet locators 54, 56 include one magnet locator 54 on the stator side 40 of each slot and one magnet locator 56 on the inner side 42 of each slot. Each magnet locator 54, 56 includes a protrusion 74, 76 that extends into the slot, forming a neck in the slot, and a shelf that abuts an end of the magnet 32. These two magnet locators 54, 56, act in cooperation with the elongated sides 40, 42 to retain the permanent magnet 32 in the slot 30.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. An electric machine comprising:
a stator;
a rotor opposing the stator; and
a plurality of slots formed in the rotor, the plurality of slots configured in a plurality of nested V-shaped slot arrangements, each nested V-shaped slot arrangement comprising an inner V-shaped slot arrangement and an outer V-shaped slot arrangement, wherein a first slot and a second slot provide opposite legs of the inner V-shaped slot arrangement and wherein a third slot and a fourth slot provide opposite legs of the outer V-shaped slot arrangement, each of the inner and outer V-shaped slot arrangements defining a vertex end and a mouth end, the vertex end positioned closer to a center of the rotor than the mouth end, wherein a stator side of each inner and outer V-shaped slot arrangement faces the mouth end, each of the plurality of slots including a stator side and an opposing side with the stator side of the slot closer to the mouth end of the V-shaped slot arrangement than the opposing side of the slot, each of the plurality of slots including a magnet retaining portion positioned between opposing end portions of the slot, wherein the magnet retaining portion is defined by at least one protrusion formed on the stator side of the slot, the at least one protrusion separating the magnet retaining portion from one of the end portions of the slot.

2. The electric machine of claim 1 wherein each of the plurality of slots are elongated in shape with the magnet retaining portion being substantially rectangular, and wherein the third and fourth slots are larger in size than the first and second slots.

3. The electric machine of claim 2 wherein at least one corner of the substantially rectangular magnet retaining portion is rounded, wherein the vertex ends of the first slot and the second slot are separated, and wherein the vertex ends of the third slot and the fourth slot are separated.

4. The electric machine of claim 3 wherein the rounded corner provides an indentation that extends the slot further to an outer perimeter of the rotor than the portion of the magnet retaining portion immediately adjacent to the rounded corner.

5. The electric machine of claim 1 wherein the opposing end portions provide void regions next to the magnet retaining portion.

6. The electric machine of claim 1 wherein the rotor comprises a main body and the at least one protrusion formed on the stator side of the slot is integrally formed with the main body of the rotor.

7. The electric machine of claim 1 wherein the at least one protrusion comprises a first protrusion formed on the stator side of the slot on a first end of the opposing end portions and a second protrusion formed on the stator side of the slot adjacent to a second end of the opposing end portions.

8. The electric machine of claim 1 wherein the at least one protrusion extends only partially into the slot and does not extend across the entire slot.

9. The electric machine of claim 1 wherein the at least one protrusion forms a neck in the slot.

10. The electric machine of claim 1 wherein magnets are positioned in the plurality of slots, and wherein the magnets in the first and second slots are smaller in size than the magnets in the third and fourth slots.

11. An electric machine comprising:
a stator;
a rotor opposing the stator;
a plurality of slots in the rotor, the plurality of slots configured in a first V-shaped slot arrangement and a second V-shaped slot arrangement, each V-shaped slot arrangement defining a vertex end and a mouth end, the vertex end positioned closer to a center of the rotor than the mouth end, wherein the first V-shaped slot arrangement is positioned within the second V-shaped slot arrangement, and each of the plurality of slots including at least one magnet locator extending into the slot; and
a plurality of magnets positioned in the plurality of slots, each magnet abutting the magnet locator in the associated slot, the magnet locator separating the magnet from a non-ferromagnetic portion provided in an end portion of the slot.

12. The electric machine of claim 11 wherein the plurality of slots are elongated in shape, wherein the plurality of magnets are substantially rectangular in shape, and wherein the magnets positioned in the first V-shaped slot arrangement are smaller in size than the magnets positioned in the second V-shaped slot arrangement.

13. The electric machine of claim 11 wherein at least one indentation is provided in each slot adjacent to the at least one magnet locator.

14. The electric machine of claim 13 wherein the at least one indentation in each slot is provided opposite a corner of the magnet.

15. The electric machine of claim 11 wherein the non-ferromagnetic portion is a void portion, and wherein the void portion is a first void portion in the slot and the magnet is positioned between the first void portion and a second void portion.

16. The electric machine of claim 11 wherein the rotor comprises a main body formed of a plurality of laminations and the at least one magnet locator is integrally formed with the main body of the rotor.

17. The electric machine of claim 11 wherein the at least one magnet locator comprises a first protrusion abutting a first end of the magnet and a second protrusion abutting a second end of the magnet.

18. An electric machine comprising:
a first core member;
a second core member opposing the first core member;
a plurality of V-shaped slot arrangements provided on the second core member, each V-shaped slot arrangement defining a mouth end and a vertex end, the vertex end closer to a center of the second core member than the mouth end, and each V-shaped slot arrangement positioned on the second core in a nested fashion with another V-shaped slot arrangement;
a plurality of magnets positioned in each V-shaped slot arrangement with voids on two opposing sides of the magnets; and
means for retaining each magnet in the V-shaped slot arrangement such that the magnet does not enter the voids.

19. The electric machine of claim 18 wherein the means for retaining comprises at least one protrusion extending into the slot.

20. The electric machine of claim 18 further comprising at least one indentation on the stator side of the slot adjacent to the means for retaining.

* * * * *